June 19, 1934.  A. ALEXAY  1,963,729
ARC WELDING
Filed April 1, 1932
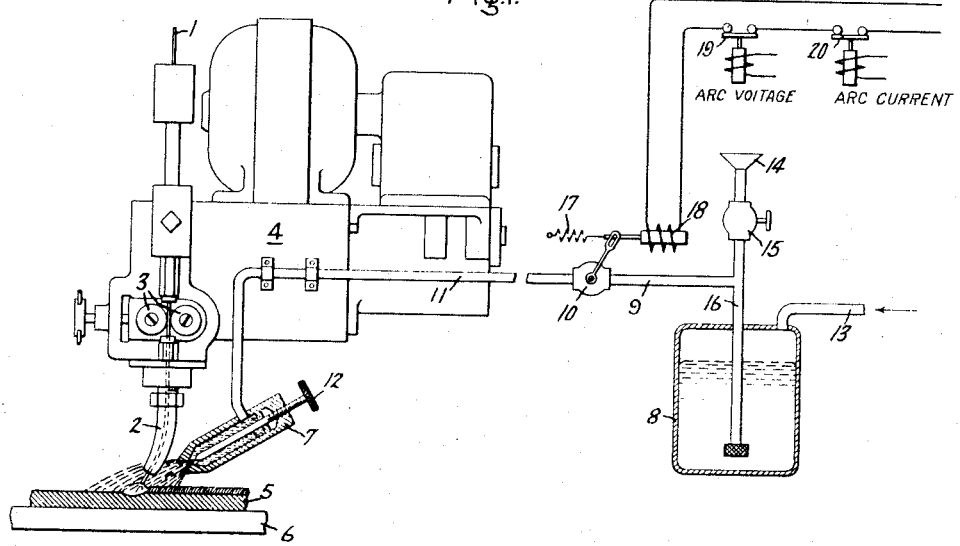
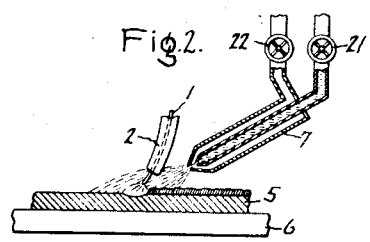
Inventor:
Adalbert Alexay,
by Charles E. Tullar
His Attorney.

Patented June 19, 1934

1,963,729

UNITED STATES PATENT OFFICE 1,963,729

ARC WELDING

Adalbert Alexay, Avenel, N. J., assignor to General Electric Company, a corporation of New York Application April 1, 1932, Serial No. 602,521

4 Claims. (Cl. 219—14)

My invention relates to arc welding.

During the formation of a weld by means of metallic arc welding, the base metal and the metal of the electrode used in making the weld are rendered molten by the arc, and unless this molten metal is suitably protected from the surrounding atmosphere it becomes contaminated, producing a weld of poor quality. The same is true of carbon arc welding in which the arc is maintained between the work and a carbon electrode and additional metal sometimes supplied by fusing a filler rod of the desired material into the weld.

In the presence of certain substances called fluxes the arc has been found to operate more satisfactorily and to deposit metal more uniformly than would be the case if these substances were not employed. These substances have also been used for their effect on the deposited metal by the formation during the welding operation of a protective atmosphere about the arc and molten portions of the weld. If the flux is applied to the electrode as a coating, difficulty is encountered in supplying welding current to the electrode as it is fed through an automatic machine. If the flux coating is thin little difficulty is experienced but if heavy coatings are used, special apparatus must be employed for removing a portion of the coating and conducting welding current into the electrode at the portion thus bared.

It is an object of my invention to supply fluxing material about the arcing terminal of an electrode as an enveloping mist of atomized liquid. By resorting to this procedure bare electrode material may be used. For automatic arc welding this greatly simplifies the construction of the welding head since the welding current may be fed directly into the surface of the electrode. At the same time desired welding conditions are obtained by completely enveloping the arcing terminal of the electrode and the molten portions of the work in a desired fluxing material which is present in sufficient quantity not only to protect the weld metal but, in many cases, to facilitate the welding operation by improving the arcing characteristics of the welding electrode.

My invention will be better understood from the following description taken in connection with the accompanying drawing, Fig. 1 of which illustrates one embodiment thereof, and Fig. 2 of which illustrates a different type of atomizer from that shown in Fig. 1.

Referring to Fig. 1 of the accompanying drawing electrode material 1 is fed through a nozzle 2 by feed rolls 3 forming part of an automatic welding head 4. The welding head may be of any desired construction by means of which through the agency of feed rolls 3 the electrode is fed toward and from the work to strike the arc and thereafter maintain it at a predetermined length and voltage. The electrode 1 is preferably unfluxed and welding current is conveniently fed thereto through nozzle 2 which may be connected to one terminal of a suitable source of welding current, the other terminal of which is connected to the work 5 or its support 6. Means may also be provided for moving the work 5 relative to the arcing terminal of electrode during the welding operation. The welding head may be moved over the work or the work may be moved under the welding head to accomplish this result.

During the welding operation a liquid fluxing material is sprayed about the arcing terminal of the electrode and over the molten portions of the weld as indicated in the drawing. This is accomplished through the agency of a spraying nozzle 7 which is supported adjacent the arcing terminal of the electrode and to which liquid is supplied from a container 8 through pipes 16 and 9, valve 10 and pipe 11. The amount of liquid supplied through the nozzle 7 is controlled by an adjusting valve 12. The liquid may be fed by gravity or by supplying gas under pressure to a closed flux container 8 through a pipe 13 to force the liquid therein through pipes 9, 16 and 11 to nozzle 7 as illustrated in the drawing. In an arrangement such as illustrated liquid may be introduced into the container 8 through a funnel 14, valve 15 and pipe 16. After a suitable supply has been placed within the container, valve 15 is closed so as to maintain the gas pressure obtained through pipe connection 13.

When the welding operation has been interrupted it is desirable to interrupt the supply of atomized liquid, and this is accomplished by means of the solenoid operated valve 10. As illustrated in the drawing this valve is biased to a closed position by means of a spring 17 and is opened through the action of a solenoid 18, the operating coil of which is energized by relays 19 and 20 when the welding arc is in operation. One of the relays, 19, may be made responsive to arc voltage and the other relay, 20, may be made responsive to arc current, as has been indicated in the drawing by the legends "Arc voltage" and "Arc current". With this arrangement the solenoid 18 is deenergized either when the arc is interrupted or when a short circuit is established between the work and the electrode, thus insuring that the valve 10 is always closed when the liquid spray is not being utilized. Such an arrangement is illustrated and claimed in Patent No. 1,746,204, E. Thomson, granted February 4, 1930 and assigned to the same assignee as the present case. It is, of course, apparent that instead of employing both arc current and arc voltage relays, a single relay responsive to arc voltage or arc current may be used for controlling the operation of the solenoid valve 10.

I prefer to use combustible liquids as fluxing material such for example as hydrocarbons and alcohols, particularly methanol. These substances when sprayed about the arcing terminal of the electrode become ignited by the arc and produce about the electrode a reducing flame of atomized liquid. Oxygen is thus excluded from the molten weld metal and when hydrocarbons are used, carbon may be introduced into the weld metal in desired quantities.

Various forms of spraying nozzle may be used without departing from my invention. For example, a nozzle of the construction shown in Fig. 2 may be used. As illustrated in this figure, the nozzle comprises independent means for supplying gas and liquid to the nozzle tip from which the liquid is supplied as a spray through the action of the gas also discharged therefrom. The supply of liquid and gas may be independently controlled through adjusting valves 21 and 22 and means such as illustrated in Fig. 1 may be employed for simultaneously interrupting the flow of both of these substances when the welding operation is stopped or interrupted.

Other arrangements for producing about the arcing terminal of the electrode and molten portions of work an enveloping mist of atomized liquid may be employed without departing from my invention. Preferably, the spray is directed across the arc in the direction of welding as indicated in the drawing. By supplying the spray in this manner the arc is directed forward in the direction of welding, and thus prepares the work for the reception of molten metal deposited from the electrode.

As has been noted above, my invention is applicable to carbon arc welding as well as metallic arc welding, and non-consuming electrodes may be used if desired. In carbon arc welding or welding with non-consuming electrodes, additional weld metal, if such is necessary, may be supplied by feeding into the arc a filler rod or by laying upon the work a supply of such material. The embodiments of my invention illustrated and described herein have been selected for the purpose of setting forth the principles involved. It will be apparent, however, that the invention is susceptible to being modified to meet different conditions encountered in its use, and I therefore aim in the appended claims to cover all modifications within the true spirit and scope of my invention.

What I claim as new and desire to secure by Letters Patent of the United States, is:—

1. The method of electric arc welding which comprises maintaining an arc and surrounding the arc and molten portions of the weld with an enveloping liquid spray.

2. The method of electric arc welding which comprises maintaining an arc and enveloping the arc with a spray of combustible liquid.

3. Welding apparatus comprising means for maintaining an arc, and means for spraying liquid fluxing material about the arcing terminal of said electrode.

4. Welding apparatus comprising electrode feeding means, and means for spraying liquid about the arcing terminal of said electrode and the molten portions of the weld.

ADALBERT ALEXAY.